(12) United States Patent
Diggins

(10) Patent No.: US 10,219,033 B2
(45) Date of Patent: Feb. 26, 2019

(54) METHOD AND APPARATUS OF MANAGING VISUAL CONTENT

(71) Applicant: Snell Advanced Media Limited, Reading, Berkshire (GB)

(72) Inventor: Jonathan Diggins, Lovedean (GB)

(73) Assignee: SNELL ADVANCED MEDIA LIMITED, Reading, Berkshire (GB)

( * ) Notice: Subject to any disclaimer, the term of this patent is extended or adjusted under 35 U.S.C. 154(b) by 0 days.

(21) Appl. No.: 15/459,860

(22) Filed: Mar. 15, 2017

(65) Prior Publication Data
US 2017/0188091 A1   Jun. 29, 2017

Related U.S. Application Data

(63) Continuation of application No. 14/623,354, filed on Feb. 16, 2015.

(30) Foreign Application Priority Data

Feb. 17, 2014 (GB) .................................. 1402775.9

(51) Int. Cl.
*H04N 21/442* (2011.01)
*H04N 21/44* (2011.01)
(Continued)

(52) U.S. Cl.
CPC ....... *H04N 21/442* (2013.01); *G06K 9/00718* (2013.01); *G06K 9/00744* (2013.01);
(Continued)

(58) Field of Classification Search
CPC ........... G06K 9/00744; G06K 9/00718; G06K 9/00758; G06K 9/6201; G06F 17/30743;
(Continued)

(56) References Cited

U.S. PATENT DOCUMENTS 6,055,018 A   4/2000 Swan
9,159,327 B1  10/2015 Postelnicu et al.
(Continued)

FOREIGN PATENT DOCUMENTS

EP   2722779 A2   4/2014
GB   2444094 A    5/2008
(Continued)

OTHER PUBLICATIONS

Extended European Search Report for Application No. 151550977 dated Nov. 17, 2015 (6 pages).
(Continued)

*Primary Examiner* — Benjamin R Bruckart
*Assistant Examiner* — Tien M Nguyen
(74) *Attorney, Agent, or Firm* — Arent Fox LLP

(57) ABSTRACT

A method of managing visual content. In one instance, the method includes receiving a stream of video fingerprints, derived in a fingerprint generator by an irreversible data reduction process, from respective temporal regions within a particular visual content stream and at a fingerprint processor that is physically separate from the fingerprint generator via a communication network. The fingerprints are processed in the fingerprint processor to generate metadata which is not directly encoded in the fingerprints. Processing of the fingerprints includes windowing the stream of fingerprints with a time window, deriving frequencies of occurrence of particular fingerprint values or ranges of fingerprint values within each time window, determining statistical moments or entropy values of said frequencies of occurrence, comparing said statistical moments or entropy values with expected values for particular types of content, and generating metadata representing the type of the visual content.

9 Claims, 6 Drawing Sheets

(51) Int. Cl.
*G06K 9/00* (2006.01)
*H04H 20/12* (2008.01)

(52) U.S. Cl.
CPC ....... *H04N 21/44008* (2013.01); *H04H 20/12* (2013.01); *H04H 2201/90* (2013.01)

(58) Field of Classification Search
CPC .............. G06F 17/30784; H04H 20/12; H04H 2201/90; H04N 17/00; H04N 21/44008; H04N 21/442
See application file for complete search history.

(56) References Cited

U.S. PATENT DOCUMENTS

| | | | |
|---|---|---|---|
| 9,275,427 B1 | 3/2016 | Sharifi | |
| 2002/0120925 A1 | 8/2002 | Logan | |
| 2005/0232411 A1 | 10/2005 | Srinivasan et al. | |
| 2006/0271947 A1* | 11/2006 | Lienhart | G06F 17/30787 725/19 |
| 2011/0222787 A1 | 9/2011 | Thiemert et al. | |
| 2011/0289114 A1 | 11/2011 | Yu et al. | |
| 2012/0239175 A1 | 9/2012 | Mohajer et al. | |
| 2013/0031582 A1* | 1/2013 | Tinsman | H04N 21/2353 725/36 |
| 2013/0254793 A1 | 9/2013 | Anniballi et al. | |
| 2013/0318114 A1 | 11/2013 | Emerson, III | |
| 2014/0259041 A1 | 9/2014 | Sharifi | |
| 2014/0277641 A1 | 9/2014 | Bilobrov | |

FOREIGN PATENT DOCUMENTS

| | | | |
|---|---|---|---|
| WO | 0128240 A1 | 4/2001 | |
| WO | WO-0128240 A1 * | 4/2001 | ....... G06F 17/30814 |
| WO | 2007022250 | 2/2007 | |
| WO | 2009104022 A2 | 8/2009 | |
| WO | 2014004914 A1 | 1/2014 | |

OTHER PUBLICATIONS

United Kingdom Patent Application No. GB 1402775.9 Search Report dated Aug. 18, 2014 (1 page).
Office Action dated Dec. 18, 2018 from corresponding EP Application No. 15 155 097.7-1207.

* cited by examiner

METHOD AND APPARATUS OF MANAGING VISUAL CONTENT

CROSS-REFERENCE TO RELATED APPLICATIONS

This application is a continuation of U.S. application Ser. No. 14/623,354, filed Feb. 16, 2015, which claims priority to United Kingdom Application No. 1402775.9, filed Feb. 17, 2014.

FIELD OF THE INVENTION

This invention concerns automatic monitoring or other managing of audio, video and audio visual content.

BACKGROUND OF THE INVENTION

The very large numbers of 'channels' output to terrestrial, satellite and cable distribution systems by typical broadcasters cannot be monitored economically by human viewers and listeners. And, audio visual content, such as films, television shows and commercials received from content providers cannot always be checked for conformance with technical standards by human operators when 'ingested' into a broadcaster's digital storage system. The historic practice of checking by a person who looks for defects and non-conformance with standards is no longer economic, or even feasible, for a modern digital broadcaster.

These developments have led to great advances in automated quality checking (QC) and monitoring systems for audio visual content. Typically QC and monitoring equipment analyses audio visual data using a variety of different algorithms that identify specific characteristics of the content such as:

Audio dynamic range
Duration of periods of silent audio or black video
Presence of subtitles
Presence of test signals
Video aspect ratio and presence or absence of 'black bars' at the edges of the video frame
Audio to video synchronisation The results of this analysis may be stored as 'metadata' that is associated with the audio visual content; or, it may be used in a monitoring system that detects defects in distributed content and alerts an operator, or automatically makes changes to signal routing etc. to correct the defect.

Typical QC and monitoring processing is complex, and the resulting volume of metadata is large. QC equipment is therefore usually placed at only a few points in a distribution or processing system, perhaps only at the system's input and output points.

SUMMARY OF THE INVENTION

It is an object of certain embodiments of the present invention to provide improved method or apparatus for automatic monitoring or other managing of audio, video and audio visual content.

This invention takes advantage of another area of development in the field of audio visual content production and distribution is the processing of audio and video content to form 'signatures' or 'fingerprints' that describe some characteristic of the content with a very small amount of data. Typically these signatures or fingerprints are associated with some temporal position or segment within the content, such as a video frame, and enable the relative timing between content streams to be measured; and, the equivalence of content at different points in a distribution network to be confirmed. In the remainder of this specification the term fingerprint will be used to describe this type of data.

It is important to distinguish between fingerprints, which are primarily for content identification and audio to video synchronisation, and ancillary data associated with audio visual data. Ancillary data will often contain data derived from a QC process, and the ancillary data may be carried with the audio and video data in a similar way to the carriage of fingerprint data. However, ancillary data directly encodes metadata, and typically can be extracted by simple de-multiplexing and decoding.

It is also important to distinguish between fingerprints and compressed images. Whilst a compressed image may be produced by a lossy encoding process which is irreversible, the compressed image remains an image and can be converted to viewable form through a suitable decoding process. A fingerprint cannot by any sensible process be converted to a viewable image.

Fingerprint generating equipment is typically simple, cheap and placed at many points within a distribution or processing system.

The invention consists in one aspect in a method and apparatus for inferring metadata from a plurality of fingerprints derived by an irreversible data reduction process from respective temporal regions within a particular audio visual, audio or visual content stream wherein the said metadata is not directly encoded in the fingerprints and the plurality of fingerprints is received via a communication network from a fingerprint generator that is physically separate from the inference process.

In a first embodiment, characteristics of a stream of fingerprints are compared in a classifier with expected characteristics of particular types of audio visual content, and the inferred metadata identifies the content type from which the fingerprints were derived. Suitably, a stream of fingerprint values is converted to the frequency domain, and the resulting frequency components are compared with expected frequency components for particular types of audio visual content.

Alternatively, a stream of fingerprint values is windowed and the frequencies of occurrence of particular fingerprint values or ranges of fingerprint values are compared with expected frequencies of occurrence for particular types of audio visual content.

In a second embodiment, the sustained occurrence of particular values of a spatial video fingerprint are detected and compared with one or more expected values for one or more expected images so as to generate metadata indicating the presence of a particular expected image.

In a third embodiment, the sustained occurrence of low values of an audio fingerprint are detected and metadata indicating silence is generated.

In a fourth embodiment, the pattern of differences between succeeding values of a temporal video fingerprint is compared with expected patterns of film cadence and metadata indicating a film cadence is generated.

DETAILED DESCRIPTION OF THE INVENTION

Figure 1:
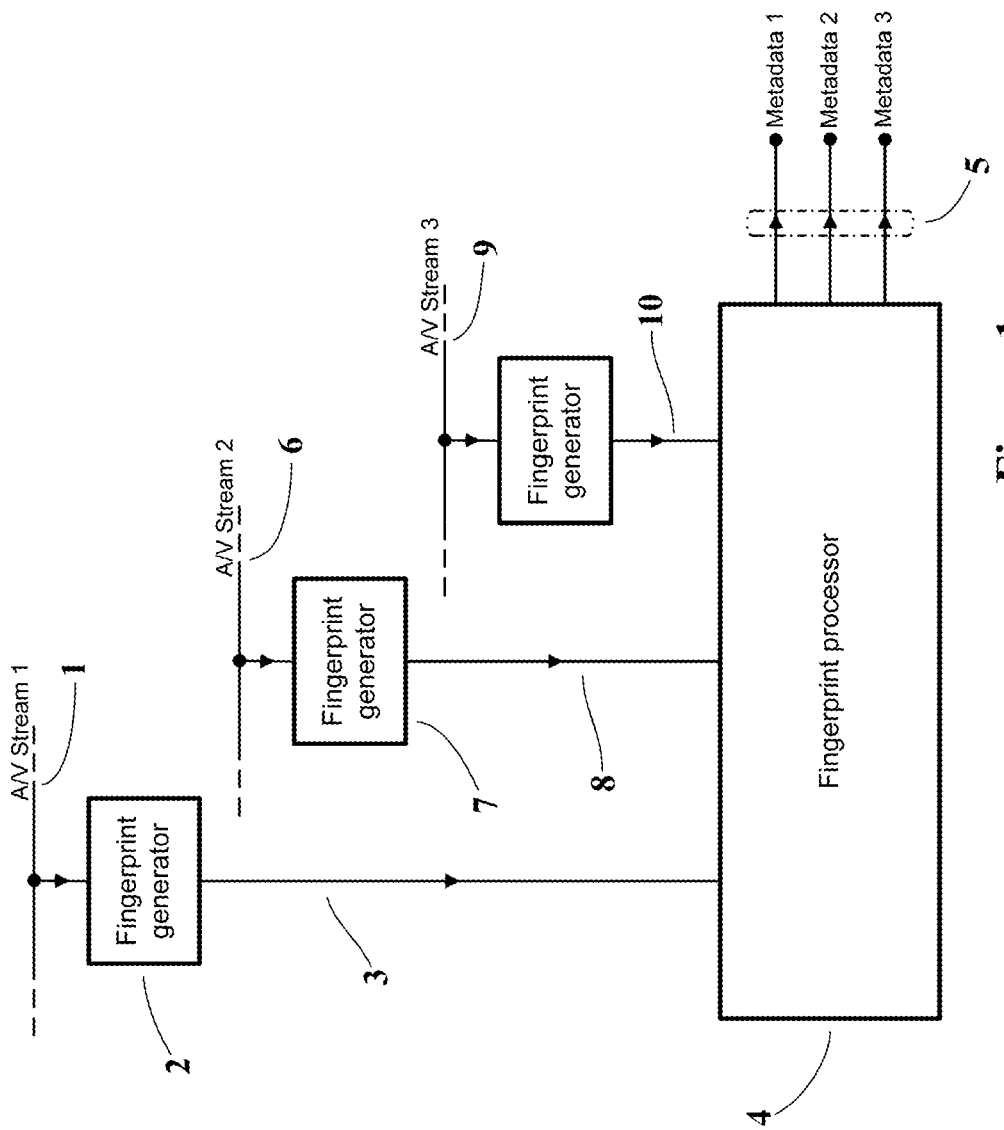
FIG. 1 shows an exemplary system according to an embodiment of the invention.

A system according to an embodiment of the invention is shown in FIG. 1. An audio visual data stream (1) is input to a fingerprint generator (2) at a point in an audio visual content distribution system. The fingerprint generator (2) outputs a fingerprint stream (3) that describes the audio visual data stream (1). The fingerprint stream (3) may describe either the audio or the video elements of the audio visual data stream (1), but typically will contain information relating to both.

The fingerprint stream (3) comprises a sequence of fingerprints, where each member of the sequence relates to a different temporal position in the data stream (1). Typically the video element of each fingerprint is derived from a different frame of video data; and, the audio element of each fingerprint is derived from a different set of audio samples. The data rate of fingerprint stream (3) is very much less than the data rate of the audio visual data stream (1). Typically the audio component of the fingerprint stream (3) has a data rate of around 150 byte/s, and the video component of the fingerprint stream (3) has a data rate of around 500 byte/s. The derivation of the fingerprint from the audio visual data is a non-reversible process; it is not possible to re-construct the audio visual data from the fingerprint. The fingerprint can be considered a hash-function of the audio visual data such that it is highly unlikely that different audio visual data will give the same fingerprint.

There are many known methods of deriving fingerprints from audio and video. International patent application WO 2009/104022 (which is hereby incorporated by reference) describes how an audio fingerprint can be derived from a stream of audio samples, and how spatial and temporal video fingerprints can be derived from video frames. Standards defining audio and video fingerprints for establishing temporal synchronization between audio and video streams are being developed.

Returning to FIG. 1, the fingerprint stream (3) is input to a fingerprint processor (4) that derives metadata (5) from the fingerprint stream (3) and is further described below.

At another place in the content distribution system a second audio visual data stream (6), that is not related to the first audio visual stream (1), is input to a second fingerprint processor (7) that generates a second fingerprint stream (8) from the second audio visual data stream (6). This second fingerprint stream is also routed to the fingerprint processor (4). Other unrelated audio, video or audio visual streams from different points within the audio visual content production and distribution process can be fingerprinted and the results routed to the fingerprint processor (4). For example, the fingerprint stream (10) describing the audio visual data stream (9) is shown as a further input to the fingerprint processor (4). As the fingerprints comprise small volumes of data, the respective fingerprint streams can be conveyed to the fingerprint processor (4) over low bandwidth links; for example, narrow-band internet connections could be used.

The metadata (5) output from the metadata processor (4) comprises metadata describing the first and second audio visual streams (1) and (6) and any other audio visual streams whose respective fingerprint streams are input to it. Typically the fingerprint processor (4) would be situated at a central monitoring location, and its output metadata (5) would be input to a manual or automatic control system that seeks to maintain the correct operation of the audio visual content production and distribution system.

Figure 2:
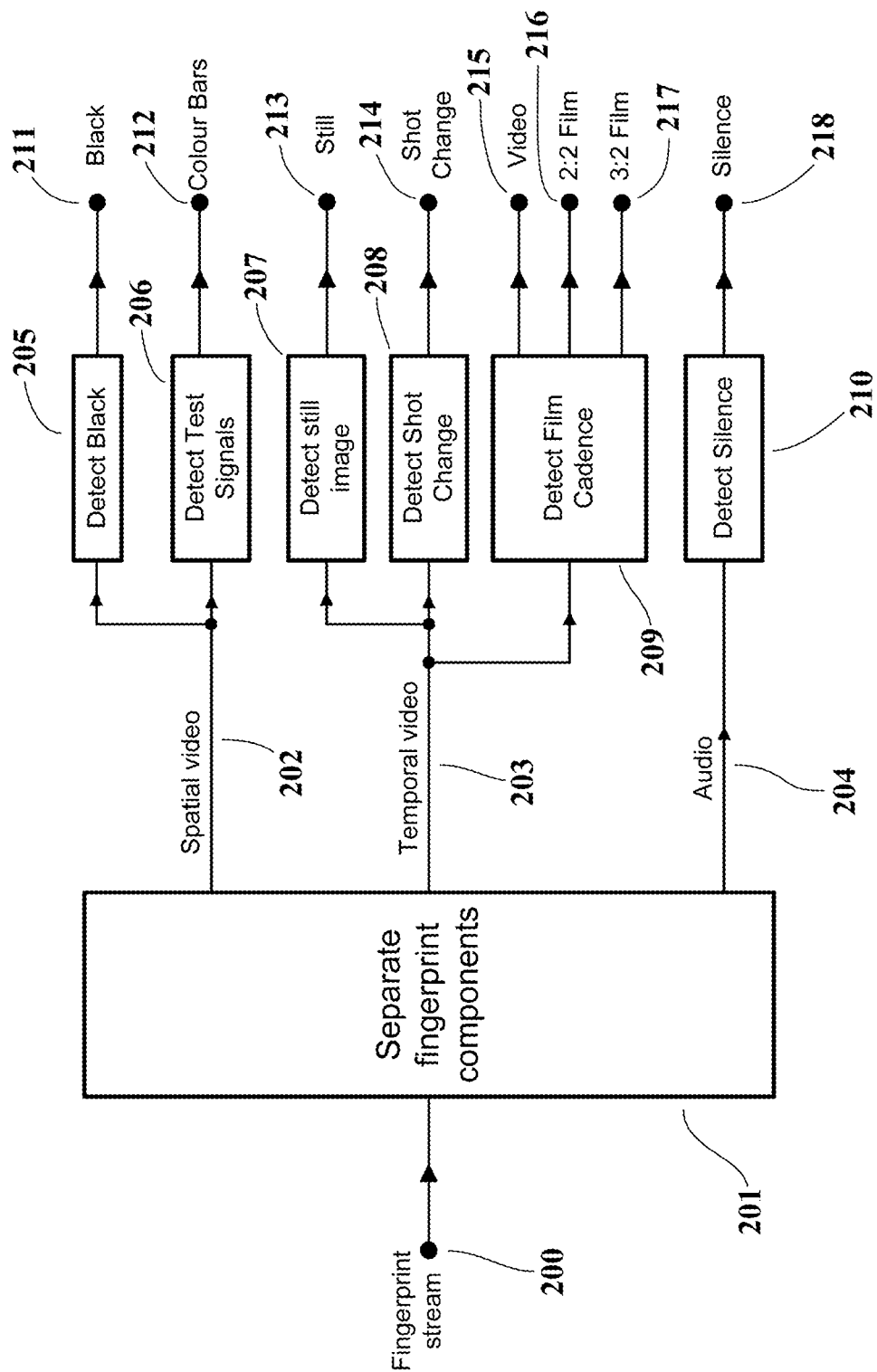
FIG. 2 shows a metadata processor according to an embodiment of the invention.

The operations carried out by the metadata processor (4) on one of its input fingerprint streams are illustrated in FIG. 2. An input fingerprint stream (200) comprises spatial video fingerprint data, temporal video fingerprint data, and audio fingerprint data relating to a sequence of temporal positions in the audiovisual data stream from which it was derived. Typically this sequence of temporal positions corresponds to fields of an interlaced video stream, or frames of a progressive video stream. In the following description it is assumed that a fingerprint is input for every field of the audio visual sequence.

A separator (201) separates out the three components of each input fingerprint of the fingerprint stream (200). The separated spatial video fingerprint stream (202) comprises respective pixel-value summations for a set of regions of each video field. This is input to a black detector (205) that compares the values with a threshold and detects the simultaneous occurrence of low values in all the regions for several consecutive fields. When this condition is detected, a Black metadata component (211) is output to a monitoring process.

The separated spatial video fingerprint stream (202) is also input to a test signal detector (206) that detects a sustained set of pixel-value summation values for a set of regions within each video field. The test signal detector (206) compares the regional pixel-value summations contained within each fingerprint of the fingerprint sequence (202) with previously-derived regional pixel-value summations for known test signals. The comparison results are compared with one or more thresholds to identify near equivalence of the values in the fingerprints with the respective values for known test signals. If a set of values closely corresponding to values for a particular known test signal, colour bars for example, is found in a consecutive sequence of fingerprints, a test signal metadata component (212) that identifies the presence of the particular test signal is output.

The separated temporal video fingerprint stream (203) is input to a still-image detector (207). The separated temporal video fingerprint stream (203) typically comprises a measure of inter-field differences between pixel-value summations for a set of regions within each video field. An example is a sum of the sums of inter-field differences for a set of regions within the frame, evaluated between a current field and a previous field. If the fingerprint contains an inter-frame difference value, or if an inter-frame difference can be derived from the fingerprint, then this is used. If a sustained low-value inter-field or inter-frame difference measure is found in a consecutive sequence of fingerprints, a still-image metadata component (213) that identifies lack of motion is output.

Figure 3:
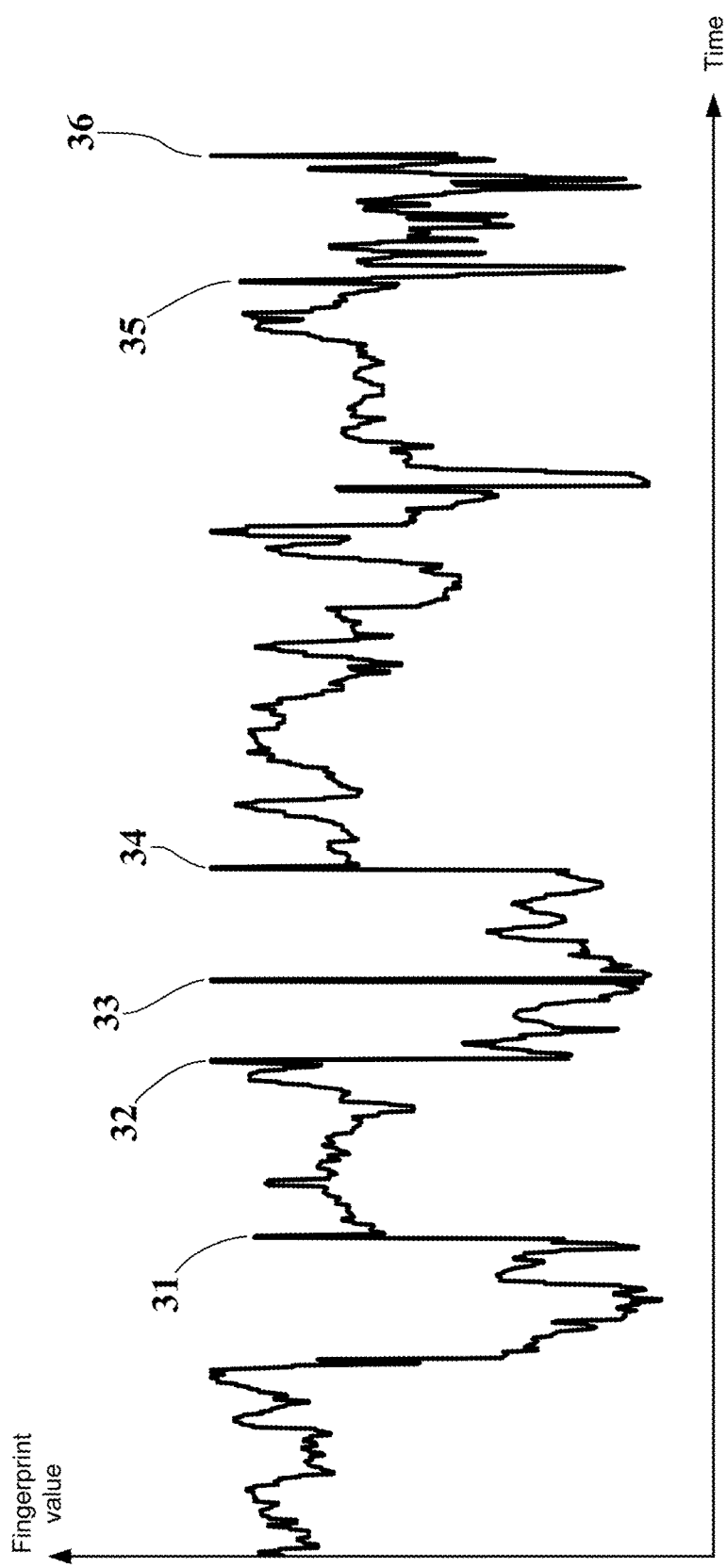
FIG. 3 shows a sequence of video temporal fingerprint values from which the positions of shot changes can be identified.

The separated temporal video fingerprint stream (203) is also input to a shot-change detector (208), which identifies isolated high values of the temporal video fingerprint by comparing the respective value differences between a fingerprint and its closely preceding and succeeding fingerprints with a threshold. If the temporal fingerprint for a field is significantly greater than the corresponding fingerprints for preceding and succeeding fields, then that field is identified as the first field of a new shot, and it is identified in a shot-change metadata output (214). A graph of temporal fingerprint value versus time for a video sequence containing shot changes is shown in FIG. 3. The isolated peaks (31) to (36) correspond to shot-changes.

Figure 4A:
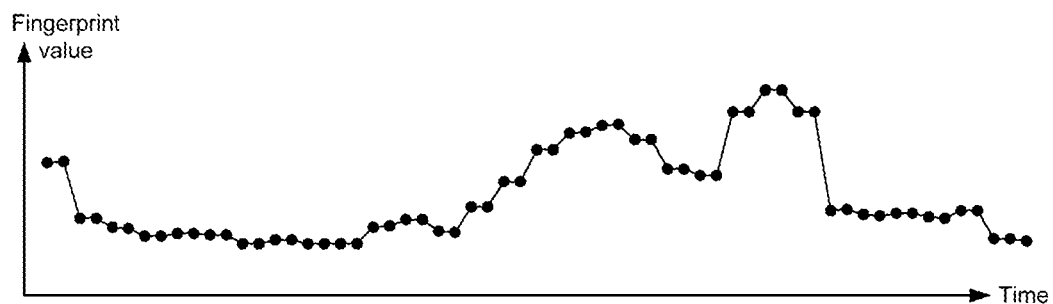
FIGS. 4a-4c show three examples of sequences of video temporal fingerprint values from which film cadence can be identified.
Figure 4B:
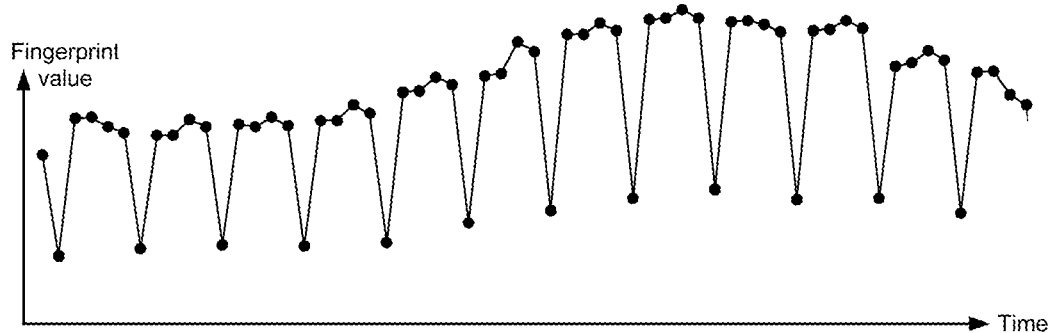
Figure 4C:
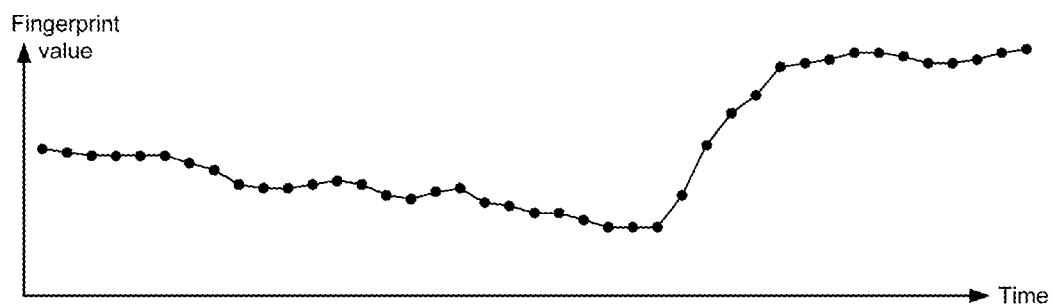

The separated temporal video fingerprint stream (203) is also analysed to detect 'film cadence' in a film cadence detector (209). FIG. 4 shows examples of sequences of temporal video fingerprint values for three different film cadences. The sequence of temporal fingerprints for succeeding fields is analysed in the film cadence detector (209), and the sequence of differences between the fingerprints is identified. If successive pairs of temporal fingerprints from adjacent fields have similar values (i.e. the differences are less than a threshold), as shown in FIG. 4*a*, then it is inferred that each pair comes from a new film frame; this is commonly known a 2:2 film cadence. If two pairs of similar values are followed by a significantly different value in a continuing sequence, as shown in FIG. 4*b*, then 3:2 film cadence, in which the ratio of the film frame rate to the video field rate is 2:5, is identified. And, if there is no pattern of similarity between the temporal fingerprints for succeeding fields, as shown in FIG. 4*c*, then video cadence is identified.

The film cadence detector (209) detects the pattern of changes between the fingerprints for succeeding fields by a known method, such as correlation of sequences of inter-fingerprint difference values with candidate sequences of differences. Metadata indicating detected video cadence (215), detected 2:2 film cadence (216) or detected 3:2 film cadence (217) is output.

The separated audio fingerprint stream (204) is input to a silence detector (210). Typical audio fingerprints are derived from the magnitudes of a sequence of adjacent audio samples. When the audio is silent the sample magnitudes are small and a sequence of low-value fingerprints results. When a sustained sequence of audio fingerprint values less than a low-value threshold is detected by the silence detector (210), it outputs silence metadata (218).

Figure 5:
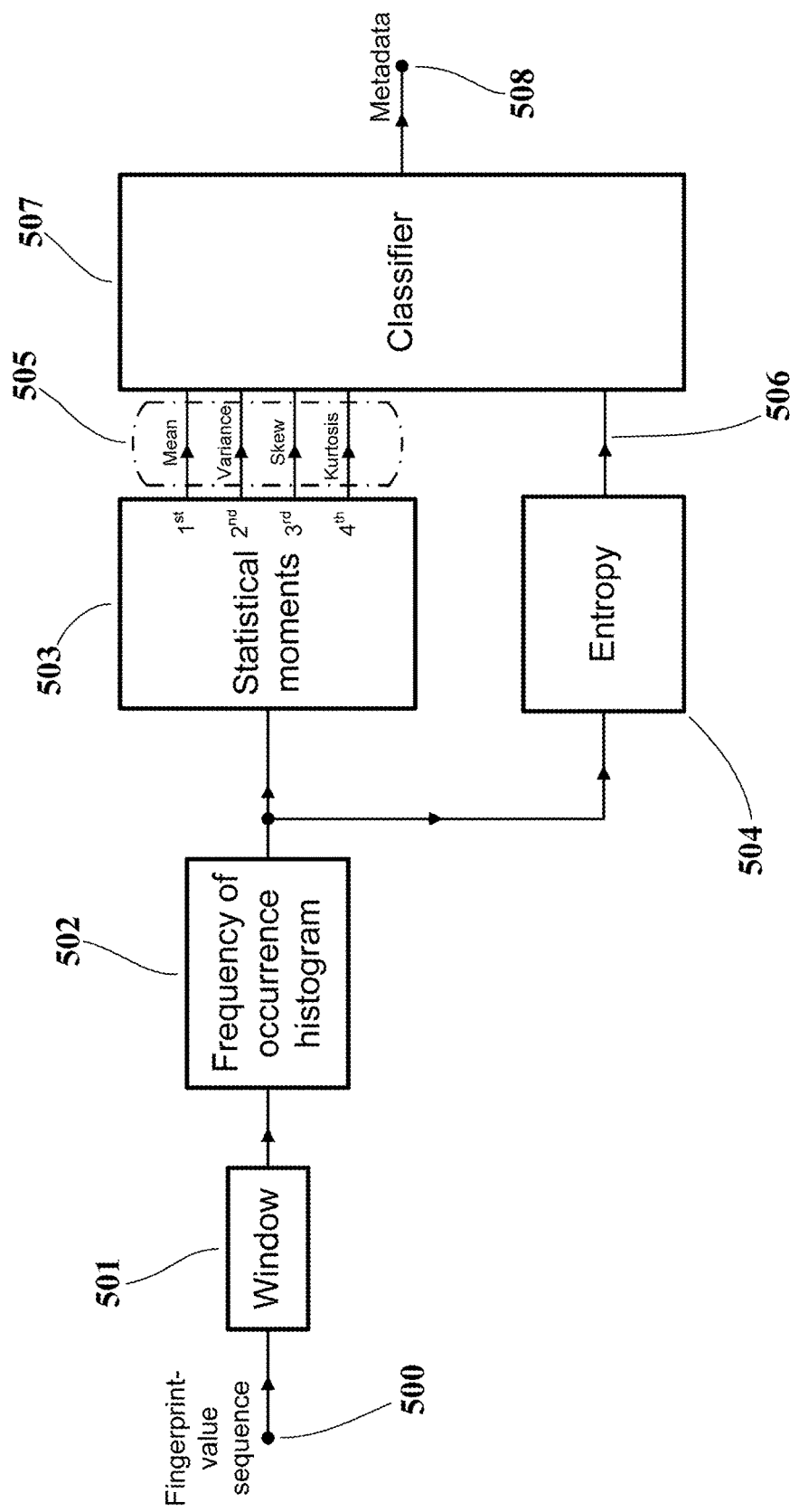
FIG. 5 shows a metadata processor according to an alternative embodiment of the invention.

A further audio visual fingerprint analysis process is shown in FIG. 5. A sequence of spatial or temporal video fingerprints (500), corresponding to fields or frames of a video or audio visual sequence, is input to a rolling window selector (501), which selects and outputs a stream of sets of adjacent fingerprint values. Typically each set corresponds to one or two seconds of video, and the sets overlap each other by a few hundred milliseconds.

Each set of fingerprint values is converted, in a histogram generator (502), to a histogram giving the respective frequencies of occurrence of values, or ranges of values, within the set. The sequence of histograms from the histogram generator (502), corresponding the sequence of adjacent fingerprint values from the window selector (501), is analysed statistically in a moment processor (503) and an entropy processor (504).

The moment processor (503) determines known statistical parameters of each histogram: The mean (or first moment); the variance (or second moment); the skew (or third moment); and the kurtosis (or fourth moment). The derivation of these known dimensionless parameters of the distribution of values within a set of values will not be described here as it is well-known to those skilled in the art.

The entropy processor (504) determines the entropy E, or 'distinctiveness' of each histogram. A suitable measure is given by the following equation:

$$E = -\Sigma p_i \log(p_i)$$

Where: $p_i$ is the number of occurrences of fingerprint value i divided by the number of fingerprint values in the set; and, The summation is made over all values of i that occur in the set.

The stream of sets of dimensionless statistical parameters (505) from the moment processor (503), and the stream of entropy values (506) from the entropy processor (504) are input to a classifier (507) that compares each of its input data sets with reference data sets corresponding to known types of audiovisual content. The output from the classifier (507) is metadata (508) that describes the type of audio visual content from which the fingerprint value sequence (500) was derived.

Typically the output of the classifier (507) is a weighted sum of the outputs from a number of different, known comparison functions, where the weights and the functions have been previously selected in a known 'training' process. In such prior training, candidate sets of comparison functions are applied iteratively to sets of statistical data (505) and entropy data (506) that have been derived from analysis (as shown in FIG. 5) of fingerprint data from known types of audio visual content. The weights and comparison functions are selected during this training so as to obtain the best agreement between the result of the weighted sum of comparisons, and the known content type of the respective training data set. The classifier (507) uses a set of comparison functions and respective weights determined in a prior training process to identify when its input corresponds to a particular member of a set of reference data sets that corresponds with a particular type of audio visual content.

Typically the following types of audio visual stream are used as training data, and are identified by the classifier (507):

Specific sports
Studio news presentation
'Talking heads'
Episodic drama
Film/movie drama
Commercials
Cartoon animation
Credit sequences
Loss of signal conditions
Recorder 'shuttle' modes Other content types may be more suitable for the control and monitoring of a particular audio visual production or distribution process.

Figure 6:
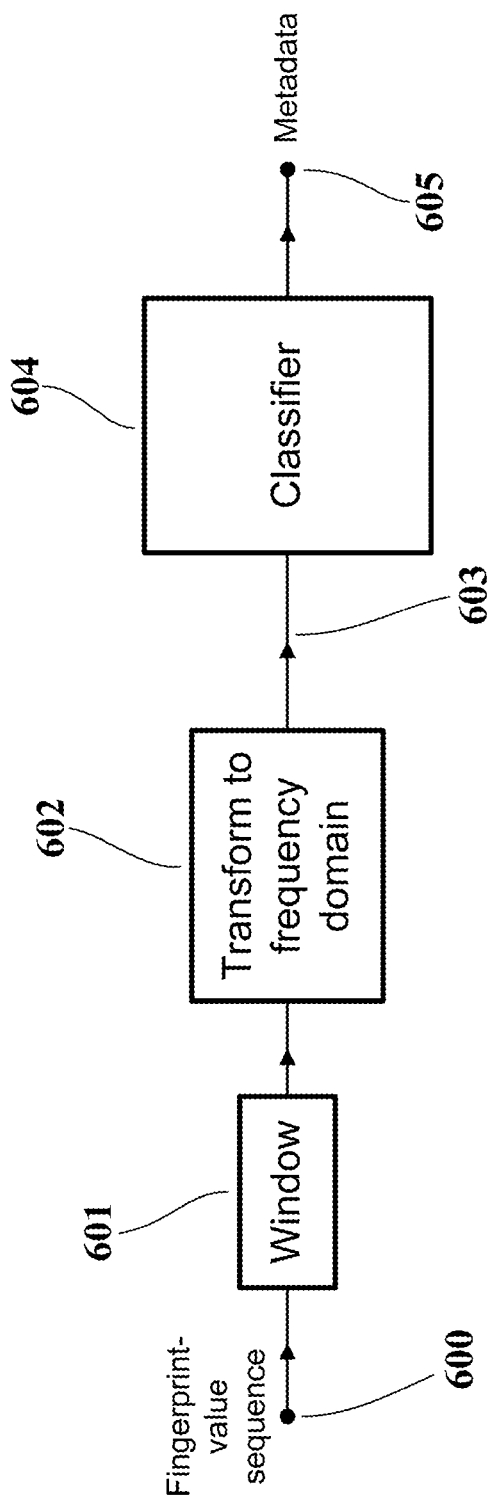
FIG. 6 shows a metadata processor according to a further alternative embodiment of the invention.

Another embodiment of the invention is shown in FIG. 6. A sequence of audio or video fingerprint values (600) is separated into sets of rolling windows by a rolling window selector (601) that operates in the same way as the previously-described window selector (501). Temporally-ordered, windowed sets of adjacent fingerprint values are transformed from the time domain to the frequency domain in a transform processor (602), whose output comprises a stream of sets of spectral components, one set for each temporal position of the rolling window applied by the window selector (601). Typically the transform processor (602) uses the well-known Fourier transform, but other time-domain to frequency-domain conversions could be used.

The stream of sets of frequency components (603) from the transform processor (602) is input to a classifier (604) that operates in the same way as the above-described classifier (507) to recognise the spectral characteristics of known types of audio visual content. Metadata (605) that describes the type of audio visual content from which the fingerprint value sequence (600) was derived is output from the classifier (604).

Some audio fingerprints, for example the 'bar code' audio signature described in international patent application WO 2009/104022, comprise a sequence of one-bit binary values. These fingerprints can conveniently be described by run-length coding, in which a sequence of run-length values indicates counts of succeeding identical fingerprint values. This is a well-known method of data compression that represents a sequence of consecutive values by a single descriptor and run-length value. In the case of binary data, the descriptor is not required, as each run-length value represents a change of state of the binary data.

Run-length values for rolling windows of a fingerprint sequence can be histogrammed and the histograms of the frequencies of occurrence of run-length values, or ranges of run-length values used to identify characteristics of the material from which the fingerprints were derived.

The reliability of all the above-described methods of extracting metadata from fingerprint data can be improved by applying a temporal low-pass filter to the derived metadata. Simple recursive filters, a running average for example, are suitable. However, there is a trade-off between reliability and speed of response. The required speed of response is different for different types of metadata. Some parameters describe a single frame, for example a black frame identifier. Other parameters relate to a short sequence of frames, for example film cadence. Yet others relate to hundreds, or even thousands, of frames, for example type of content. The temporal filters applicable to these different types of metadata will have different bandwidths.

Changes in the values of metadata derived by the methods described in this specification contain useful information which can be used to derive higher level metadata. For example, the frequency of occurrence of shot changes can be used to infer content type.

Several different methods of analysing fingerprint data have been described. A metadata inference process according to the invention can use one or more of these methods; not all elements of a particular fingerprint need be analysed.

Processing of spatial video fingerprints, temporal video fingerprints and audio fingerprints has been described. These methods of obtaining metadata from fingerprint data are applicable to one type of fingerprint, or combinations of different types of fingerprint derived from the same temporal position within an audio visual content stream. The relationship between different fingerprint types derived from the same content can be used to determine metadata applicable to that content.

Typically the temporal position of an available audio fingerprint will have a fixed relationship to the temporal position of an associated available video fingerprint for the same content stream at the same point in an audio visual content production or distribution process. In this case combination of the results video fingerprint analysis according to the invention with the results of audio fingerprint analysis according to the invention will give a more reliable determination of metadata for the audio visual sequence than would be achieved by analysis of the audio or video fingerprints in isolation.

The principles of the invention can be applied to many different types of audio video or audio visual fingerprint. Audio and/or video data may be sub-sampled prior to generating the applicable fingerprint or fingerprints. Video fingerprints may be derived from fields or frames.

The invention claimed is:

1. A method of managing visual content, comprising the steps of:
   receiving a stream of video fingerprints, derived in a fingerprint generator by an irreversible data reduction process from respective temporal regions within a particular visual content stream, at a fingerprint processor that is physically separate from the fingerprint generator via a communication network; and
   processing said fingerprints in the fingerprint processor to generate metadata which is not directly encoded in the fingerprints; wherein said processing includes:
      windowing the stream of video fingerprints with a time window,
      deriving frequencies of occurrence of particular fingerprint values or ranges of fingerprint values within each time window by converting each set of particular fingerprint values to a histogram,
      determining statistical moments or entropy values of said frequencies of occurrence,
      comparing said statistical moments or entropy values with expected values for particular types of content,
      generating metadata representing the type of the visual content, and
      providing the metadata to a control system for managing video content distribution.

2. The method according to claim 1, wherein said statistical moment comprises one or more of the mean; variance; skew or kurtosis of said frequencies of occurrence.

3. The method according to claim 1, wherein said communication network comprises the Internet.

4. The method according to claim 1, wherein a video fingerprint stream has less than 500 bytes of data per field.

5. The method according to claim 1, wherein a video fingerprint stream has less than 200 bytes of data per field.

6. The method according to claim 1, wherein said content comprises a video stream of video frames and wherein a fingerprint is generated for substantially every frame in the video stream.

7. An apparatus for use in managing visual content, the apparatus comprising:
   a fingerprint processor configured to receive via a communication network a stream of video fingerprints derived in a fingerprint generator that is physically separate from the fingerprint processor by an irreversible data reduction process from respective temporal regions within a particular visual content stream, the fingerprint processor including
      a window unit configured to receive said stream of video fingerprints and apply a time window,
      a frequency of occurrence histogram unit configured to derive the frequencies of occurrence of particular fingerprint values in each time window by converting each set of particular fingerprint values to a histogram,
      a statistical moment unit configured to derive statistical moments of said frequencies of occurrence, and
      a classifier configured to generate from said statistical moments metadata representing the type of the visual content to provide the metadata to a control system for managing video content distribution.

8. The apparatus according to claim 7, further comprising an entropy unit configured to derive entropy values for histograms of frequencies of occurrence and wherein said classifier is configured to generate said metadata representing the type of the visual content additionally from said entropy values.

9. A non-transitory computer readable medium comprising a computer program which causes programmable apparatus to implement a method of managing visual content, comprising the steps of:

receiving a stream of video fingerprints, derived in a fingerprint generator by an irreversible data reduction process from respective temporal regions within a particular visual content stream, at a fingerprint processor that is physically separate from the fingerprint generator via a communication network; and processing said fingerprints in the fingerprint processor to generate metadata which is not directly encoded in the fingerprints; wherein said processing includes:

windowing the stream of video fingerprints with a time window, deriving frequencies of occurrence of particular fingerprint values or ranges of fingerprint values within each time window by converting each set of particular fingerprint values to a histogram, determining statistical moments or entropy values of said frequencies of occurrence, comparing said statistical moments or entropy values with expected values for particular types of content, generating metadata representing the type of the visual content, and providing the metadata to a control system for managing video content distribution.

\* \* \* \* \*